United States Patent [19]

Best et al.

[11] Patent Number: 4,759,936
[45] Date of Patent: Jul. 26, 1988

[54] COLORED FOOD COMPOSITION, IN PARTICULAR FOR DECORATIVE USE

[75] Inventors: Christian Best, 39 A. rue du Vernand, Annemasse, France, F-74100; Jean-Pierre Michel; Denise Lejeune, both of Collonges-sous-Saleve, France

[73] Assignee: Christian Best, Annemasse, France

[21] Appl. No.: 933,521

[22] PCT Filed: Mar. 7, 1986

[86] PCT No.: PCT/FR86/00072
§ 371 Date: Oct. 29, 1986
§ 102(e) Date: Oct. 29, 1986

[87] PCT Pub. No.: WO86/05363
PCT Pub. Date: Sep. 25, 1986

[30] Foreign Application Priority Data

Dec. 3, 1985 [FR] France .................. 85 03797

[51] Int. Cl.$^4$ .................. A23L 1/275; A23L 1/04
[52] U.S. Cl. .................. 426/250; 426/540; 426/575; 426/573; 426/576
[58] Field of Search .......... 426/573, 575, 576, 250, 426/540

[56] References Cited

U.S. PATENT DOCUMENTS

| 2,191,352 | 2/1940 | Aprean | 426/575 |
| 2,694,643 | 11/1954 | Robinson | 426/576 |
| 2,864,706 | 12/1958 | Stoloff | 426/575 |
| 3,483,002 | 12/1969 | Stein | 426/573 |
| 3,493,383 | 2/1970 | Ryan | 426/573 |
| 4,381,318 | 4/1983 | Lynch | 426/573 |
| 4,471,001 | 9/1984 | Lynch | 426/573 |

FOREIGN PATENT DOCUMENTS 0223630 6/1985 Fed. Rep. of Germany ...... 426/573

Primary Examiner—Jeanette Hunter
Attorney, Agent, or Firm—Wegner & Bretschneider

[57] ABSTRACT

An edible gelled emulsion of a combination of oil, a hydrophobic pigment and/or 5 coloring, an emulsifier, a gelling agent and water.

The gelling agent constitutes carrageen, optionally agar-agar; the gelled emulsion can also contain guar gum, gelatin, or mixtures thereof.

The gelled emulsion is used, for food decorating.

10 Claims, No Drawings

COLORED FOOD COMPOSITION, IN PARTICULAR FOR DECORATIVE USE

The present invention relates to a colored food product, in particular for decorative use, and to a process for producing such a food composition. The invention also relates to the use of this composition as food decoration for example, for cured fish or meat products or "charcuterie" (cold meats, pâtés and the like) and for "pâtisserie" (pastries) or frozen products.

In the sphere of "charcuterie", for example pâtés, or of "pâtisserie" it is desirable to decorate the products with various patterns or inscriptions (for example birthday cakes). To do this, it is possible to use plastic objects, but it is obviously much more preferable to use a food composition which can be eaten with the actual product.

In industry, problems are encountered due to the fact that food decoration is difficult to position automatically, its mechanical properties deteriorate rapidly over time and the coloring which it contains has a high tendency to diffuse into the product on which it is placed.

Thus, with traditional food decorations, when the food is coated in jelly, the colors migrate rapidly into the jelly, which is an aesthetically disastrous effect. For the same reasons, it is difficult to produce multi-colored decorations because the colorings will gradually mix by migrating into one another.

Thus again in frozen products such as "bûches" (log-type cakes), traditional food decorations do not freeze well and do not allow automatic positioning.

According to the specification EP-A No. 0 048 123, gelled emulsions containing alginates are known, which are set by the action of divalent or trivalent ions, for example $Ca^{++}$ ions. Thus, the gels obtained are irreversible, and in particular not heat-reversible. They are used as coating and covering agents for all sorts of food products. They are intended to have a protective or covering effect and are necessarily relatively sticky.

The invention allows the problems mentioned above to be overcome without having the disadvantages of the gels described in the above-mentioned European specification. It relates to a colored food composition, in particular for decorative use, which has very good mechanical stability, does not deteriorate over time and allows automatic positioning. This composition freezes well and shows good color retention when it is surrounded with substances with a high water content such as jelly.

The composition is flexible and elastic and is heat-reversible, giving an impression of melting in the mouth of the consumer. It is not flavored and is organoleptically completely neutral, leaving the impression only of the food product which it is decorating.

According to the invention, the colored food composition is characterized by the following combination expressed in parts by weight:

| | |
|---|---|
| oil | 3 to 7 |
| hydrophobic pigment and/or coloring | 0.2 to 2 |
| emulsifier | 1 to 2 |
| gelling agent comprising carrageen | 0.1 to 2 |
| water | 75 to 95. |

The composition has a non-sticky feel and can therefore be packaged according to a further embodiment of the invention. In particular, it may be presented in individual packages of the blister type, for example. It can easily be removed from its mold.

Preferably the oil is composed of triglycerides, the emulsifier is composed of mono and/or diglycerides and the gelling agent also contains agar-agar. The agar-agar is advantageously in proportions by weight of between 15 and 75% of the total gelling agent.

The composition can also contain other constituents intended to give it a particular character depending on the use which is envisaged, for example, guar gum, gelatin, glycerol and citric acid (taste and pH adjustment).

The colored food composition can also contain potassium sorbate or another potassium salt such as KCl in a proportion of from 0.01 to 0.1% by weight, and may be flavored by addition of a suitable flavoring agent.

Any food-quality coloring or pigment which may be hydrophobic or completely water-insoluble may be used as coloring. Examples include fat-soluble chlorophyll (E 141), paprika oil, marigold oil, parsley oil, fat-soluble annatto (E 160) and vegetable black (E 153). The entire range of colors can thus be covered.

A preferred range of compositions is as follows, for example, expressed in parts by weight:

| | |
|---|---|
| oil | 3 to 7 |
| hydrophobic pigment and/or coloring | 0.2 to 2 |
| emulsifier | 1 to 2 |
| carrageen | 0.1 to 2 |
| guar gum | 0.1 to 2 |
| gelatin | 5 to 15 |
| glycerol | 2 to 5 |
| potassium sorbate | 0.1 to 0.01 |
| citric acid | for pH = 5.0 |
| water | 75 to 85. |

To prepare this food composition, a dispersion of the gelling agent in water is firstly prepared, optionally with guar gum and gelatin, at a temperature of between 80° and 100° C. The dispersion is stirred until complete homogeneity is achieved, then the emulsifier and a solution of the coloring in oil or a suspension of the pigment in oil is added to form an emulsion which is allowed to cool to between 50° and 80° C. before shaping and cooling to ambient temperature. The desired colored food composition is thus obtained.

Shaping can be effected by injection or by pouring into molds of suitable dimensions and shapes. The products can be packaged in individual packs, for example in blister packs.

The food composition obtained may be composite and multi-colored, and may comprise several different colors which can form a pattern. It is merely necessary to combine, for example, several streams each corresponding to a different colored food composition. The multi-colored pattern, whether conserved as such or deposited on a food product remains stable over time. The colorings do not mix.

Unlike the emulsions described in the specification EP-A-No. 0 048 123 which are irreversible gels resulting from the reaction of an alginate and $Ca^{++}$ ions, the composition according to the invention has a certain flexibility and elasticity due precisely to the use of carrageen. Guar gum may be used, if necessary, for regulating the water contents to prevent possible syneresis, in particular during freezing/defrosting cycles (important in the frozen and deep-frozen product industry).

The compositions according to the invention melt in the mouth whereas the emulsions in the European specification have a "chewing gum" type texture. Furthermore, certain food colorings flocculate or fade in the presence of $Ca^{++}$ and cannot therefore be used in these emulsions. The range of colorings accessible to the compositions of the invention is therefore wider.

Finally, the advantages of these compositions also include:

high stability of the colorings which do not migrate mechanical strength and sufficient elasticity for convenient manipulation, in particular for automated positioning.

a non-sticky feel for easy release from the packaging or for positioning on the food without sticking to it, rapidity of gelling allowing high production rates to be expected.

The invention is illustrated in the following non-limiting examples.

EXAMPLE 1

4.0 g of carrageen and 6.0 g of agar-agar are incorporated successively in 700 g of vigorously stirred water in a reactor thermally regulated to a temperature of between 95° and 100° C. The mixture is stirred for approximately 1 hour until the gelling agents have completely dissolved.

9.3 g of a KIRNOL emulsifier which is a mixture of mono and diglycerides of fatty acids and 30.0 g of a solution in oil of 3.5 g of an orange food coloring (marigold oil) are then added.

Stirring is continued so as to produce a perfectly stable emulsion of these various constituents.

The formulation is then brought to a temperature of from 70° to 80° C. and is poured into plastic molds of the appropriate shape. The gel sets rapidly, in a few minutes at ambient temperature and can be further accelerated by chilling, after which the molds are closed tightly by heat welding or high frequency welding.

The product has excellent mechanical properties combining strength and flexibility. It keeps very well as it is and also when positioned on a "charcuterie" product and coated into jelly. The coloring does not migrate into the jelly.

EXAMPLE 2

The same type of emulsion allows insoluble powdered vegetable charcoal, used as black pigment, to be stabilised in homogeneous and stable manner.

7.2 g of KIRNOL emulsifier, "21.8 g of triglyceride oil and 7.5 g of charcoal are added successively to the gelling agents dissolved in water as before.

The mixture is emulsified before pouring the formulation.

The product obtained has characteristics comparable to the product of Example 1 both mechanically and with respect to colored pigment retention.

EXAMPLE 3

Several varied coloring emulsions are produced:
green by means of chlorophyll pigment
orange by means of marigold pigment
black by means of vegetable charcoal
yellow by means of annatto pigment.

These formulations are poured simultaneously into appropriate molds. They are juxtaposed without the colors mixing.

Multi-colored molded articles can thus be produced: imitation fruits, vegetables . . . .

For use on a food product, for example frozen log-type cake, mixing of the colors and migration thereof into the food product are not observed.

EXAMPLE 4

5.6 g of carrageen, 4.0 g of guar gum, 180 g of gelatin (degree of viscosity 200 to 400 Bloom) are incorporated successively in 600 g of vigorously stirred water in a reactor thermally regulated to a temperature of between 95° and 100° C. The mixture is stirred for approximately 1 hour until these polymers have completely dissolved. 60 g of glycerol, 12 g of KIRNOL emulsifier, 48 g of a vegetable oil containing a sufficient quantity of colorant in a dispersed or dissolved state are then added.

Stirring is continued so as to produce a stable emulsion of these various constituents.

The formulation is then treated and packaged as described in Example 1.

This type of formulation is perfectly suitable for the production of molded decorations intended for the frozen dessert and "pâtisserie" industry.

What is claimed is:

1. An edible gelled emulsion comprising, expressed in parts by weight:

| | |
|---|---|
| oil | 3.0 to 7.0 |
| hydrophobic pigment, coloring, or mixtures thereof | 0.2 to 2.0 |
| emulsifier | 1.0 to 2.0 |
| gelling agent comprising a carrageen | 0.1 to 2.0 |
| water | 75.0 to 95.0 |

2. A gelled emulsion according to claim 1, wherein the oil is constituted by triglycerides.

3. A gelled emulsion according to claim 1, wherein the emulsifier is constituted by monoglycerides, diglycerides or mixtures thereof.

4. A gelled emulsion according to claim 1, wherein the gelling agent also contains agar-agar in proportions of between 15 and 75% of the total gelling agent.

5. A gelled emulsion according to claim 1, wherein it also contains guar gum in a proportion of from 0.1 to 2 parts by weight.

6. A gelled emulsion according to claim 1, wherein it also comprises gelatin in a proportion of from 5 to 15 parts by weight.

7. A gelled emulsion according to claim 1, wherein it also comprises glycerol in a proportion of from 2 to 5 parts by weight.

8. A gelled emulsion according to claim 1, wherein it is packaged in blister packs.

9. A process for the production of a gelled emulsion, said emulsion comprising oil (3.0 to 7.0 parts by weight), hydrophobic pigment, coloring, or mixtures thereof (0.2 to 2.0 parts by weight), emulsifier (1.0 to 2.0 parts by weight), gelling agent comprising a carrageen (0.1 to 2.0 parts by weight) and water (75.0 to 95.0 parts by weight); the process comprising the following steps:

(1) preparing a solution of gelling agent and water at a temperature of between 80° C. and 100° C.;

(2) adding to the solution of step 1, an emulsifying agent and a solution of suspension or the coloring or pigment in oil and forming an emulsion;
(3) cooling the emulsion of step 2 to between 50° C. and 80° C.;
(4) shaping the cooled emulsion; and
(5) further cooling the shaped emulsion of step 4 so as to obtain a colored edible gelled emulsion at ambient temperature.

10. A process according to claim 9, wherein guar gum (0.1 to 2 parts by weight), gelatin (5 to 15 parts by weight) or mixtures thereof, in water, is added with the gelling agent.

* * * * *